US006810386B1

(12) United States Patent
Yurino et al.

(10) Patent No.: US 6,810,386 B1
(45) Date of Patent: Oct. 26, 2004

(54) COMPANY INFORMATION DISCLOSURE SYSTEM AND MEMORY MEDIUM

(75) Inventors: Toshiki Yurino, Tokyo (JP); Satoshi Koga, Ohmiya (JP); Takafumi Asakura, Kawasaki (JP); Shuji Yamamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/144,638

(22) Filed: Aug. 31, 1998

(30) Foreign Application Priority Data

Apr. 9, 1998 (JP) .......................................... 10-097461

(51) Int. Cl.[7] .......................... G11B 19/00; G06F 17/60
(52) U.S. Cl. .............................. 705/37; 705/35; 705/36
(58) Field of Search ................................ 705/1, 30, 32, 705/35, 36, 37, 38, 232, 248; 709/248, 239, 240, 203, 208, 207, 210, 230, 232, 318, 400

(56) References Cited

U.S. PATENT DOCUMENTS

| | | | | |
|---|---|---|---|---|
| 4,677,552 A | * | 6/1987 | Sibely, Jr. ..................... 364/408 |
| 4,837,786 A | * | 6/1989 | Gurantz et al. ................ 370/20 |
| 5,101,353 A | * | 3/1992 | Lupien et al. ................. 705/37 |
| 5,335,277 A | * | 8/1994 | Harvey et al. ................ 380/20 |
| 5,678,175 A | * | 10/1997 | Stuart et al. ................. 455/13.1 |
| 5,758,328 A | * | 5/1998 | Giovannoli ................... 705/26 |
| 5,887,141 A | * | 3/1999 | Trugman ..................... 709/227 |
| 5,915,209 A | * | 6/1999 | Lawrence .................... 455/31.2 |
| 5,918,156 A | * | 6/1999 | Tanabe ........................ 455/12.1 |
| 5,987,432 A | * | 11/1999 | Zusman et al. ................ 705/35 |

| | | | | |
|---|---|---|---|---|
| 6,223,286 B1 | * | 4/2001 | Hashimoto ................... 713/178 |

FOREIGN PATENT DOCUMENTS

WO    WO97/13379    * 4/1997 ............ H04Q/7/14

OTHER PUBLICATIONS

Vancouver Exchange Makes Disclosure Even Easier, Mathew Greco, Investor Relations Business, New York: Aug. 3, 1998, p. 1.*

* cited by examiner

*Primary Examiner*—Eric W. Stamber
*Assistant Examiner*—Yehlega Retta
(74) *Attorney, Agent, or Firm*—Staas & Halsey, LLP (57) ABSTRACT

A company information disclosure system quickly discloses information about companies listed in a securities exchange with fairness and in an adequate time to enhance the trading of the securities. A transmission server stores a registration program which registers company information while a disclosure time determining program produces a table required for disclosing processes at the time of registration of the company information. The disclosure time determining program uses the registration program by setting the company information disclosure time to be a time determined by adding a predetermined time to a closing time of trading in the securities exchange. A satellite distribution program distributes company information by way of satellite and a server distribution program distributes company information using a terrestrial line. A reception verification program receives a reception completion message from a reception server, which in turn has received information via the satellite, and provides notification of a message to verify the reception of information to an ordinary WWW server. The reception verification program thereby controls the start of disclosure of information via the WWW server.

8 Claims, 13 Drawing Sheets

DIAGRAM SHOWING THE DISCLOSURE TIME
SPECIFYING TABLE ADDRESSED TO A SECURITIES EXCHANGE

| PUBLISHER CODE | DATE OF PUBLISHING | DISCLOSURE ATTRIBUTE | DISCLOSED TO: | DISCLOSURE TIME |
|---|---|---|---|---|
| JOINT-STOCK COMPANY | DATE a 1 | REPORT OF FINAL ACCOUNT | SECURITIES EXCHANGE | TIME A 1 |
| BOND ISSUING COMPANY | DATE a 2 | SCHEME | SECURITIES EXCHANGE | TIME A 2 |
| ⁓ | ⁓ | ⁓ | ⁓ | ⁓ |
| PUBLIC ENTERPRISE | DATE a i | SCHEME | SECURITIES EXCHANGE | TIME A i |
| ⁓ | ⁓ | ⁓ | ⁓ | ⁓ |
| SECRETARY COMPANY | DATE a n | GUIDE FOR RECRUIT | SECURITIES EXCHANGE | TIME A n |

FIG. 3

DIAGRAM SHOWING THE DISCLOSURE TIME
SPECIFYING TABLE ADDRESSED TO ORDINARY
WWW SERVER

| PUBLISHER CODE | DATE OF PUBLISHING | DISCLOSURE ATTRIBUTE | DISCLOSED TO: | DISCLOSURE TIME |
|---|---|---|---|---|
| JOINT-STOCK COMPANY | DATE b 1 | REPORT OF FINAL ACCOUNT | ORDINARY WWW | TIME B 1 |
| BOND ISSUING COMPANY | DATE b 2 | SCHEME | ORDINARY WWW | TIME B 2 |
| ⋮ | ⋮ | ⋮ | ⋮ | ⋮ |
| PUBLIC ENTERPRISE | DATE b i | SCHEME | ORDINARY WWW | TIME B i |
| ⋮ | ⋮ | ⋮ | ⋮ | ⋮ |
| SECRETARY COMPANY | DATE b n | GUIDE OF RECRUIT | ORDINARY WWW | TIME B n |

FIG. 4

DISTRIBUTION RECORD FORMAT

COMPANY INFORMATION DISCLOSURE SYSTEM AND MEMORY MEDIUM

CROSS-REFERENCE TO RELATED APPLICATIONS

This application is based upon and claims priority of Japanese Patent Application No. 10-097461 filed Apr. 9, 1998, the contents being incorporated herein by reference.

BACKGROUND OF THE INVENTION

The present invention relates to a company information disclosure system for disclosing company information. More particularly, the present invention relates to a company information disclosure system for joint-stock companies that issue stock certificates through a securities exchange.

The joint-stock companies listed in the stock market are registered through the issuance of stock certificates, i.e. "issues", to the securities exchange. The security exchange provides for mediation of the stock certificate, trading of the stock certificate, and disclosure of the trading price for each stock certificate. The joint-stock company also distributes stock dividends, depending upon the amount of stock certificates owned by respective stockholders, to the investors as a part of the profit obtained through company management. Therefore, when it is announced that a dividend for a current term will be increased more than a preceding term by a report of the final account of the relevant company, the trading price of an issued stock certificate will be raised more than before disclosure of the final account because the buy order of the relevant issue will be increased.

Meanwhile, when it is announced, on the contrary, that the report of the final account of the dividend of the current term will be decreased more than a preceding term, the trading price of an issued stock certificate is lowered more than that before disclosure of the report of the final account because the sell order of the relevant issue will be increased.

However, in the case where a company listed in the stock market discloses information, each listed company discloses information by a desired method and at a desired time. When the influence of the disclosed information from a relevant company is considered, it is desirable that the information be distributed simultaneously to many persons.

Today, it is now possible to obtain various pieces of information through the use of the Internet. The related art for simultaneously disclosing information using the Internet is set forth below.

Figure 14:
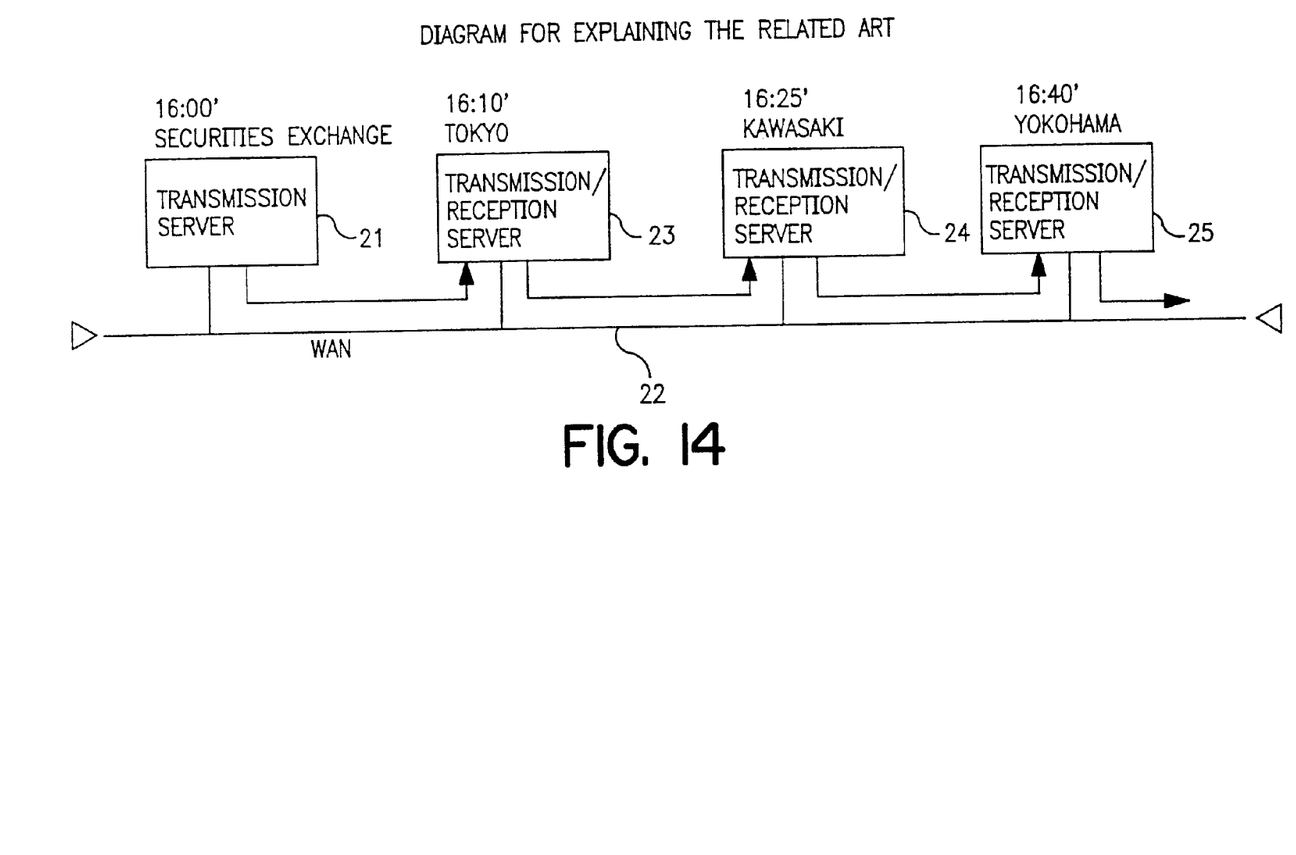
FIG. 14 is a block diagram illustrating a distribution system structure utilizing an Internet high speed digital network according to the related art.

FIG. 14 is a block diagram illustrating a distribution system structure utilizing an Internet high speed digital network. The method of distributing information to the subscribers utilizing the Internet network of the related art will be explained briefly.

In the Internet, information is sequentially distributed via a primary node recognized by an authority, such as JPNIC, which executes management of unique IP addresses using an TCP/IP protocol.

FIG. 14 illustrates an example of a connection of transmission server 21 of a stock exchange to a transmission/reception server 23 at Tokyo of a higher node. The transmission/reception server 23 at Tokyo is connected to the transmission/reception server 24 at Kawasaki via the connection of the primary node of Tokyo to Wide Area Network ("WAN") 22. The transmission/reception server 24 at Kawasaki is also connected to the transmission/reception server 25 at Yokohama via the primary node connected to WAN 22. The information is then sequentially distributed step by step from the primary node to the secondary node of Tokyo, to the secondary node of Kawasaki, and then to the secondary node of Yokohama.

In this case, considering an event that information distribution is not completed due to a rise of line load of WAN 22 and a delay in process of the transmission/reception server of the primary node, the distribution information is transmitted to the transmission/reception sever of adjacent nodes by introducing a method to accumulate the distribution information to a hard disc of the transmission/reception server of each node when the information reception is completed.

Therefore, as illustrated in the example of FIG. 14, there is a problem in that it is impossible to simultaneously disclose the distribution information because the information registered in the stock exchange at a time, for example, 16:00 is disclosed at the time 16:10 in Tokyo, at the time 16:25 in Kawasaki, and at the time 16:40 in Yokohama.

Moreover, it has also been considered that a satellite is used as a medium for simultaneous reception of relevant information by a plurality of subscribers. By using a plurality of processors to receive information from a satellite, it is possible to almost simultaneously disclose the information. However, when a method other than the satellite method is used, it is impossible for the processors to simultaneously disclose the information.

BRIEF SUMMARY OF THE INVENTION

It is therefore an object of the present invention to solve the above-mentioned problem by executing fair and quick disclosure of listed company information with an adequate processing time.

It is a further object of the present invention to timely realize information disclosure through the use of Internet.

Moreover, it is a further object of the present invention to solve the difficulty in simultaneous information disclosure using the Internet network having a characteristic protocol.

It is an even further object of the present invention to solve the difficulties in simultaneous information disclosure through elimination of protocol characteristics in an Internet network.

Objects of the present invention are achieved by a company information disclosure system, including registration means for registering company information; disclosure time determining means for determining a disclosure time of the company information registered by the registration means on the basis of a predetermined trading time of the securities exchange; and disclosure means for disclosing the company information registered by the registration means at the disclosure time determined by the disclosing timing determining means.

Additional objects of the present invention are achieved by a company information disclosure apparatus, including disclosure time determining means for determining a disclosure time of registered company information on the basis of a predetermined time of the securities exchange; and disclosure means for disclosing the registered company information with a plurality of processors at the disclosure time determined by the disclosure time determining means.

Moreover, objects of the present invention are achieved by a memory medium to be read by a computer, storing programs for operation by a computer, disclosure time determining means for determining a registered company information disclosure time on the basis of a predetermined time of a securities exchange and disclosure means for disclosing the registered company information with a plurality of processors at the disclosure time determined by the disclosure time determining means.

Additional objects of the present invention are achieved by a information disclosure system, including first distributing means for distributing registered disclosure information with a satellite; second distributing means for distributing the disclosure information with a terrestrial line; and reception verifying means for verifying reception of a communication signal distributed by the first distributing means and for controlling an information disclosure time in a processor which has received the disclosure information from the terrestrial line.

Objects of the present invention are further achieved by an information disclosure system, including first distributing means for distributing registered disclosure information with a satellite; second distributing means for distributing the disclosure information with a terrestrial line; and reception verifying means for verifying reception of a communication signal distributed by the first distributing means and for controlling the information disclosure time in a processor which has received the disclosure information from the terrestrial line.

Even further objects of the present invention are achieved by a memory medium to be read by a computer, and to store programs for operating the computer, including first distributing means for distributing registered disclosure information with a satellite; second distributing means for distributing the disclosure information with a terrestrial line; and reception verifying means for verifying reception of a communication signal distributed by the first distributing means and for controlling the information disclosure time in a processor which has received the disclosure information from the terrestrial line.

BRIEF DESCRIPTION OF THE DRAWINGS

These and other objects and advantages of the present invention will become apparent and more readily appreciated from the following description of the preferred embodiments, taken in conjunction with the accompanying drawings of which.

DETAILED DESCRIPTION OF THE PREFERRED EMBODIMENTS

Reference will now be made in detail to the preferred embodiments of the present invention, examples of which are illustrated in the accompanying drawings, wherein like reference numerals refer to like elements throughout.

Figure 1:
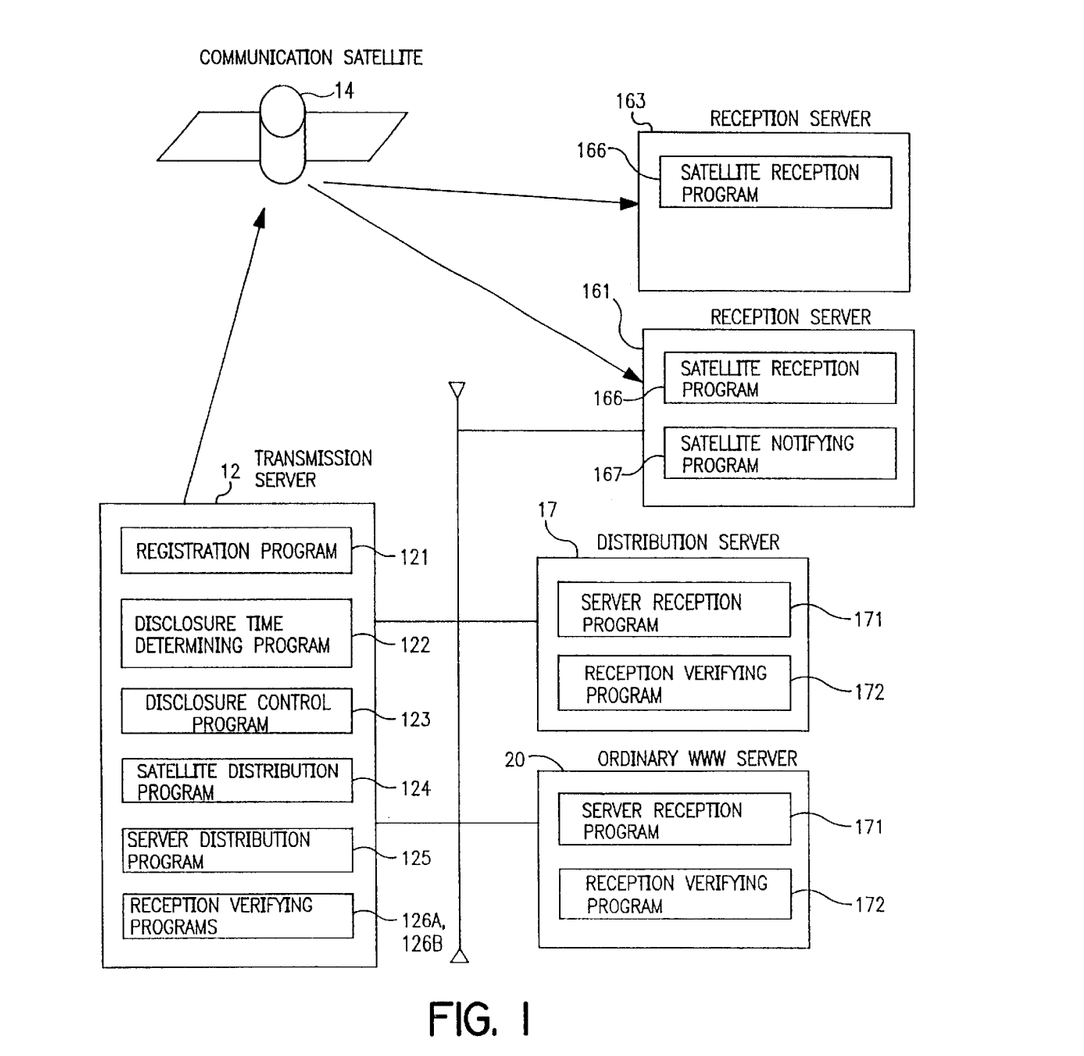
FIG. 1 is a block diagram of a principle structure of a preferred embodiment of the present invention.

FIG. 1 is a block diagram illustrating a principle structure of a preferred embodiment of the present invention. As illustrated in FIG. 1, transmission server 12 registers company information and controls distribution of the company information to a plurality of processors in a plurality of distribution units, including reception server 161, reception server 163, distribution server 17, and ordinary www server 20. Transmission server 12 also communicates with satellite 14, and in turn, reception servers 161 and 163 receive company information via satellite 14. Distribution server 17 receives company information via a terrestrial line and an ordinary WWW server 20 also receives company information via the terrestrial line. A difference between ordinary WWW server 20 and distribution server 17 lies in a difference of a subscriber to whom information is disclosed. The information stored in the ordinary WWW server 20 is disclosed to the public. However, information is distributed to the ordinary WWW server 20 with a certain delay (i.e. after 12 hours) from the distribution server 17.

The programs stored in transmission server 12 will be further explained as set forth below. Registration program 121 registers company information while a disclosure time determining program 122 produces a table required for disclosing processes at the time of registration of the company information. The disclosure time determining program 122 uses a registration program by setting, as the company information disclosure time, a time determined by adding a predetermined time to the closing time of trading in the object securities exchange.

Disclosure control program 123 controls the disclosure of information while satellite distribution program 124 distributes company information by way of satellite 14. Server distribution program 125 distributes company information using a terrestrial line.

Reception verification program 126 receives a reception completion message from reception server 161 (which has received information via the satellite 14), provides notification of a message to verify the reception of information to ordinary WWW server 20, and controls the start of disclosure of information.

In regard to the reception server 163, satellite reception program 166 receives data transmitted from satellite 14 while reception notifying program 167 provides notice of the reception of information with the satellite reception program to distribution server 17 or transmission server 12.

In regard to distribution server 17 or ordinary WWW server 20, server reception program 171 receives company information transmitted from transmission server 12 via a terrestrial line. Reception verification program 172 receives a reception verification message from reception server 161 or transmission server 12 to initiate disclosure of corresponding company information.

The problem of disclosing company information explained above with an adequate turn around time may be solved by providing registration program 121 for registering company information, disclosure time determining program 122 for determining the registered company information disclosing time on the basis of the trading time of securities exchange, and disclosure control program 123 for disclosing the registered company information to a plurality of processors in the determined disclosing time.

Moreover, the problem of simultaneously disclosing company information to a plurality of processors may be solved by providing a satellite distribution program 124 for distributing registered disclosure information with a satellite, a server distribution program 125 for distributing the disclosure information with a terrestrial line, and reception verification programs 126a, 126b for verifying reception of the communication signal of the satellite to control the information disclosure time in the processor which receives disclosure information from a terrestrial line.

The present invention will now be explained in greater detail in accordance with a preferred embodiment of the present invention as applied to a job for reporting a final account of a joint-stock company.

Figure 2:
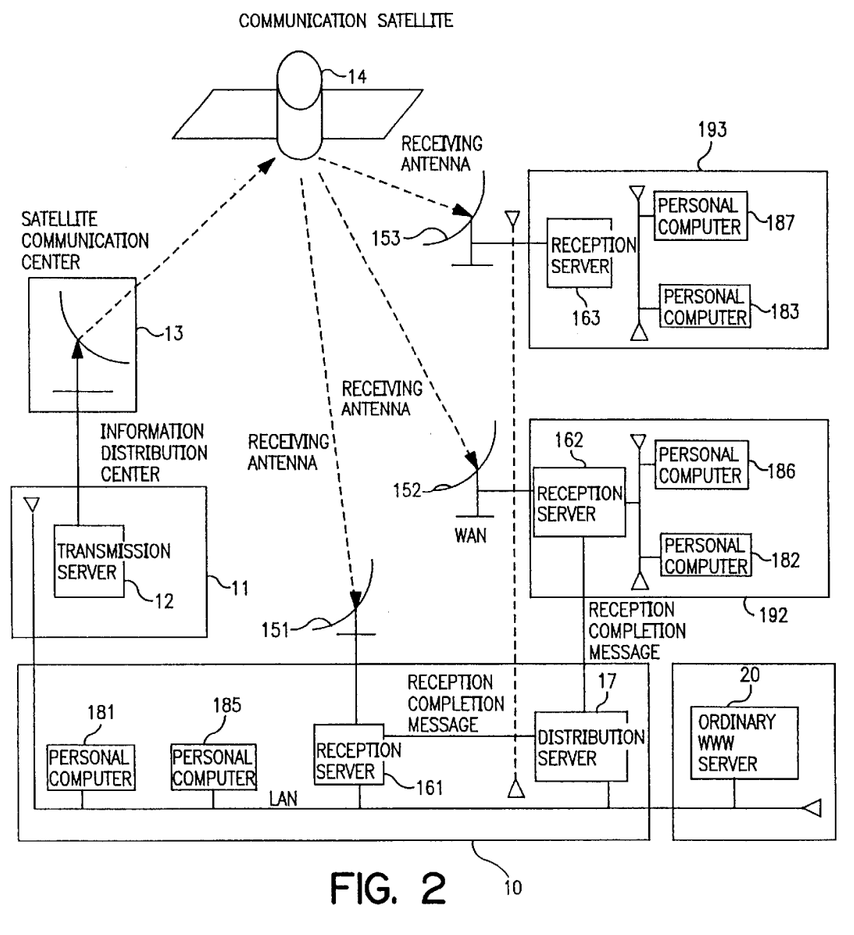
FIG. 2 is block diagram of a system structure of a preferred embodiment of the present invention.

FIG. 2 is a system structure according to a preferred embodiment of the present invention. Transmission server 12 is installed in information distribution center 11, in the form of a stock exchange, for registering company information and controlling distribution of the disclosure information. Examples of company information include a report of final account. Registration of company information can be made from a personal computer (not illustrated) to be connected to transmission server 12 through the network. Transmission server 12 is connected to a satellite communication center 13 to transmit the information to communication satellite 14.

In another place of stock exchange 10, a reception server 161, a distribution server 17, and personal computers 181 to 185 are provided and connected to transmission server 12 in the stock exchange via a LAN.

The reception server 161 in the stock exchange 10 receives a communication signal transmitted from communication satellite 14 via the receiving antenna 151. Upon completion of reception, reception server 161 notifies the distribution server 17 with a reception completion message.

Distribution server 17 in stock exchange 10 discloses a received report of final account depending on retrieval from personal computers 181 and 185 of the stock exchange 10.

The reception server 162 in receiving area 192 receives a communication signal transmitted from communication satellite 14 via receiving antenna 152. The received report of final account is disclosed depending on retrieval from the personal computers 182 to 186 connected by LAN to the reception server 162 in the receiving area 192.

Receiving area 193 is also formed in the same structure as receiving area 192. Reception server 163 receives a communication signal transmitted from the communication satellite 14 via the receiving antenna 153 and discloses the received report of final account depending on the retrieval from the personal computers 183 and 187 connected by a LAN with the reception server 163. Reception servers 162 and 163 transmit the reception completion message to distribution server 17 connected by a wide area LAN when the reception is completed.

The reception servers 162, 163 explained above are controlled by the news media. The transmission server 12 transmits a communication signal to communication satellite 14 via the satellite communication center 13, while the communication satellite 14 transmits the communication signal received from the satellite communication center 13.

Ordinary WWW server is available for access by ordinary users. Different from the server controlled by the news media, ordinary WWW server 20 can transmit information stored therein on a real-time basis. After 12 hours from distribution of information to the news media server, information is disclosed by ordinary WWW server 20.

Figure 3:
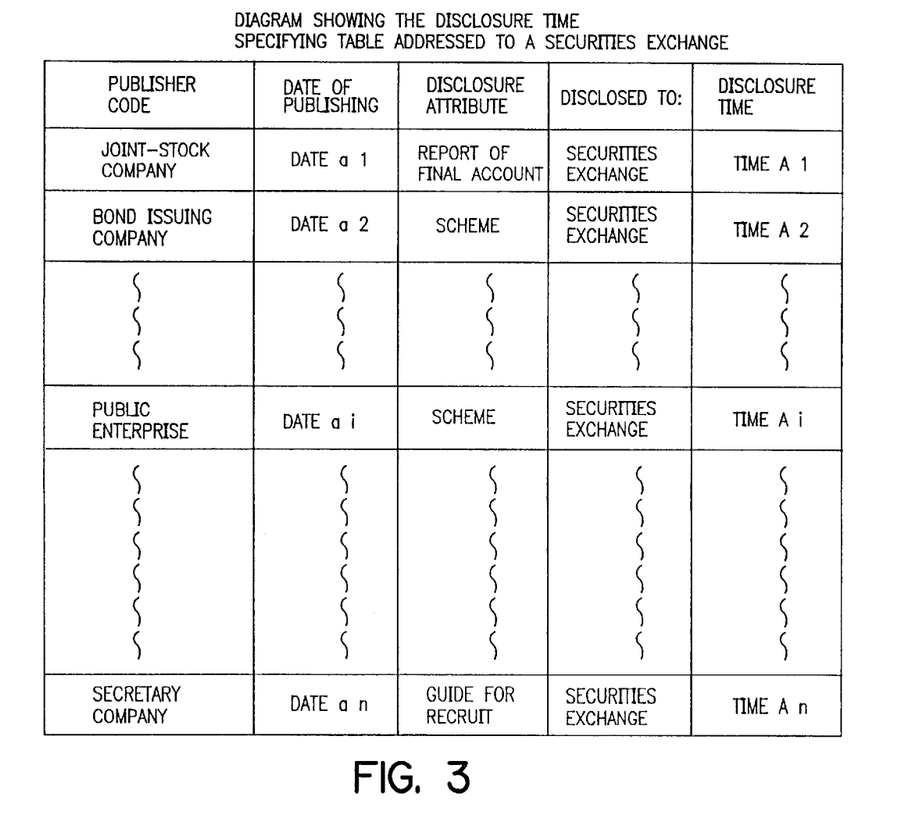
FIG. 3 is a block diagram of a disclosure time specifying table addressed to a securities exchange according to a preferred embodiment of the present invention.
Figure 4:
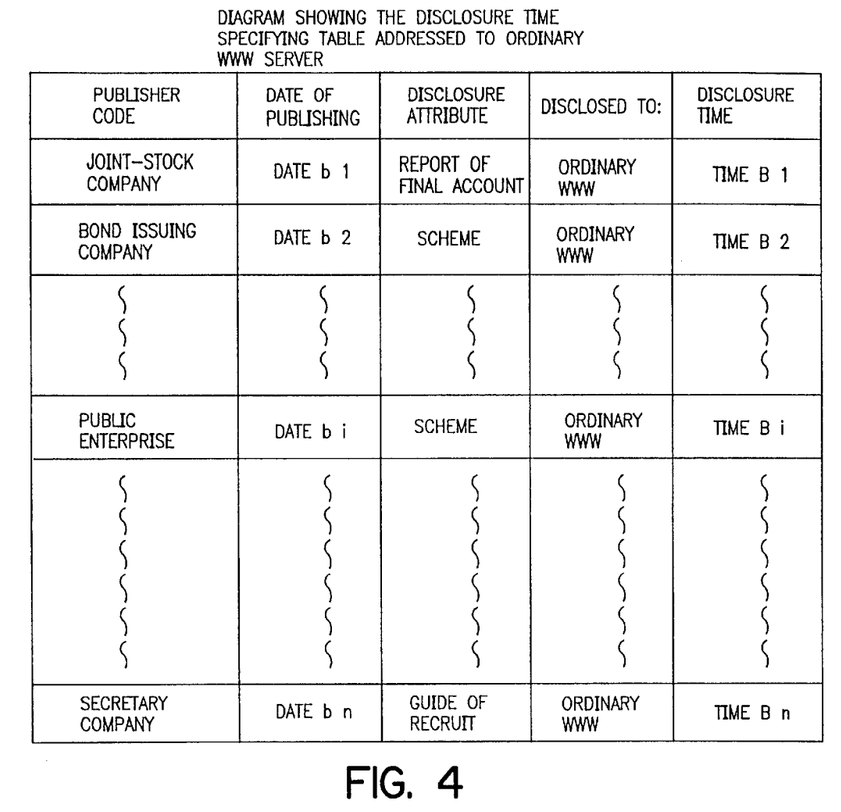
FIG. 4 is a block diagram of a disclosure time specifying table addressed to an ordinary WWW server according to a preferred embodiment of the present invention.

FIG. 3 and FIG. 4 illustrate a data format of a disclosure time specifying table which is generated when each company has registered information to be disclosed. In the column of the date of publishing, the date of issue (disclosing date) is designated when each company has registered the disclosure information. The dates are listed in the order of a1, a2, . . . ai, . . . an. If the date of publishing is not designated, the current date is stored. In the column of publisher code, identification information of the publisher for publishing the relevant information is stored and in the column of the disclosing attribute, a class of information to be disclosed is stored. In the column of the disclosure object (designated as "disclosed to:"), a destination for distribution of information to be disclosed is stored. In the column of the disclosure time, the disclosure time of information to be disclosed is stored.

FIG. 3 illustrates a record in a case where a disclosure object is selected for disclosure to the processors in the stock exchange. The closing time of the securities trading in the stock exchange +30 minutes is set as the disclosure time when the disclosure object is the stock exchange.

FIG. 4 illustrates a record in a case where a disclosure object is selected as the ordinary WWW server. In this case, the disclosure time of the stock exchange +12 hours is set as the disclosure time.

The reason why the disclosure time is set after the closing time of securities trading in the stock exchange, when the stock exchange is selected as a disclosure object, is to avoid unfairness in a situation when a person who has quickly obtained novel information can make a profit by trading in a very short period of time. To this stock exchange, the processors of the news media are also included and information is distributed to the news media using the satellite 14.

Figure 5:
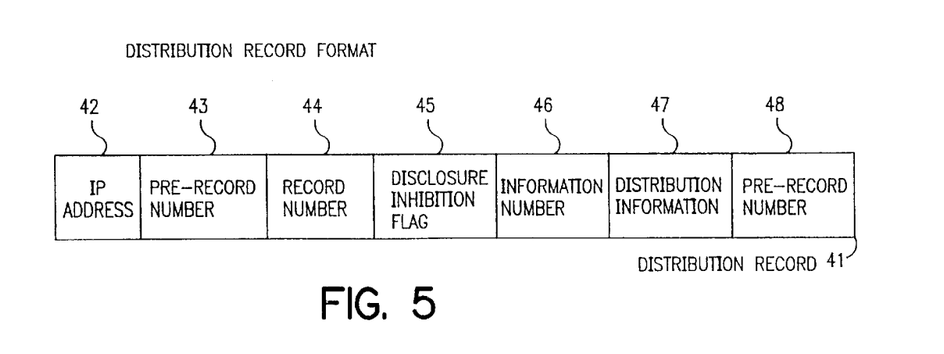
FIG. 5 is a block diagram of a distribution record format according to a preferred embodiment of the present invention.

FIG. 5 is an example of a distribution record format according to a preferred embodiment of the present invention. A distribution record 41 includes an IP address 42 corresponding to a transmitting side specified by a TCP/IP protocol. Distribution record 41 also includes a pre-record number 43, a record number 44, a disclosure inhibition flag 45, an information number 46, a distribution information 47 and a post-record number 48. The report of fmal account is recorded in the distribution information 47.

When the disclosure inhibiting flag 45 is ON, a response indicating that there is no information is returned for retrieval. When the disclosure inhibition flag 45 is OFF, distribution information is transmitted for retrieval.

Figure 6:
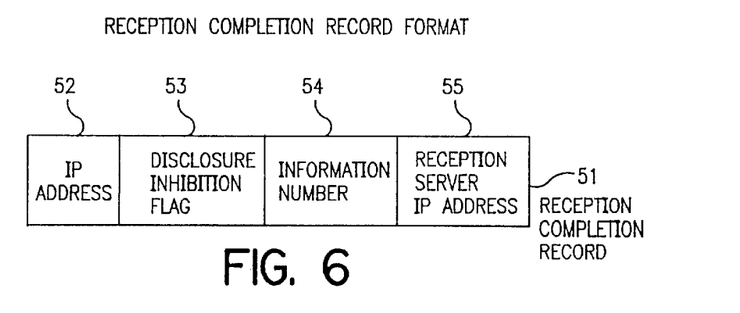
FIG. 6 is a block diagram of a reception completion record format according to a preferred embodiment of the present invention.

FIG. 6 is an example of a format of a reception completion record. Reception completion record 51 is formed of an IP address 52 corresponding to a transmitting side, a disclosure inhibition flag 53, an information number 54 and an IP address 55 of a reception server. The disclosure inhibition flag 53 is set to OFF and the reception completion message is transmitted to the distribution server 17.

Figure 7:
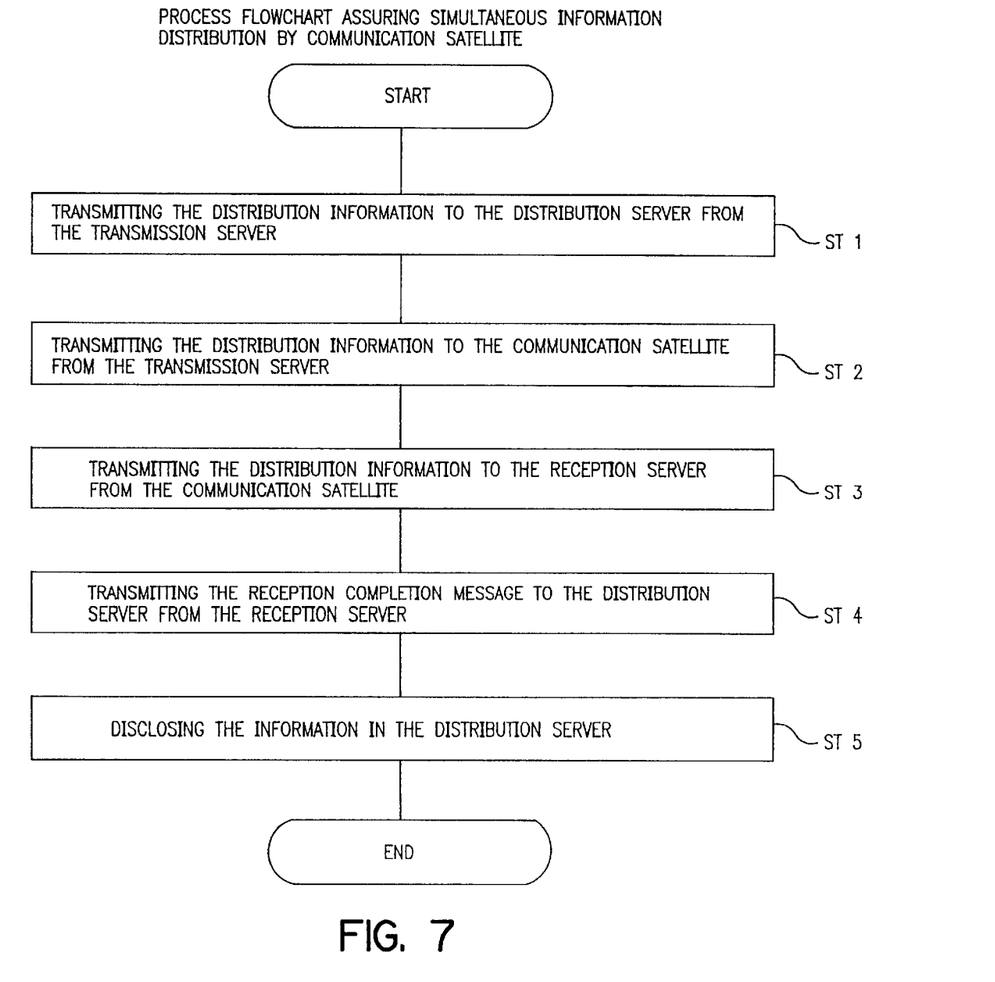
FIG. 7 is a block diagram of a process flowchart for assuring simultaneous information distribution according to a preferred embodiment of the present invention.
Figure 8:
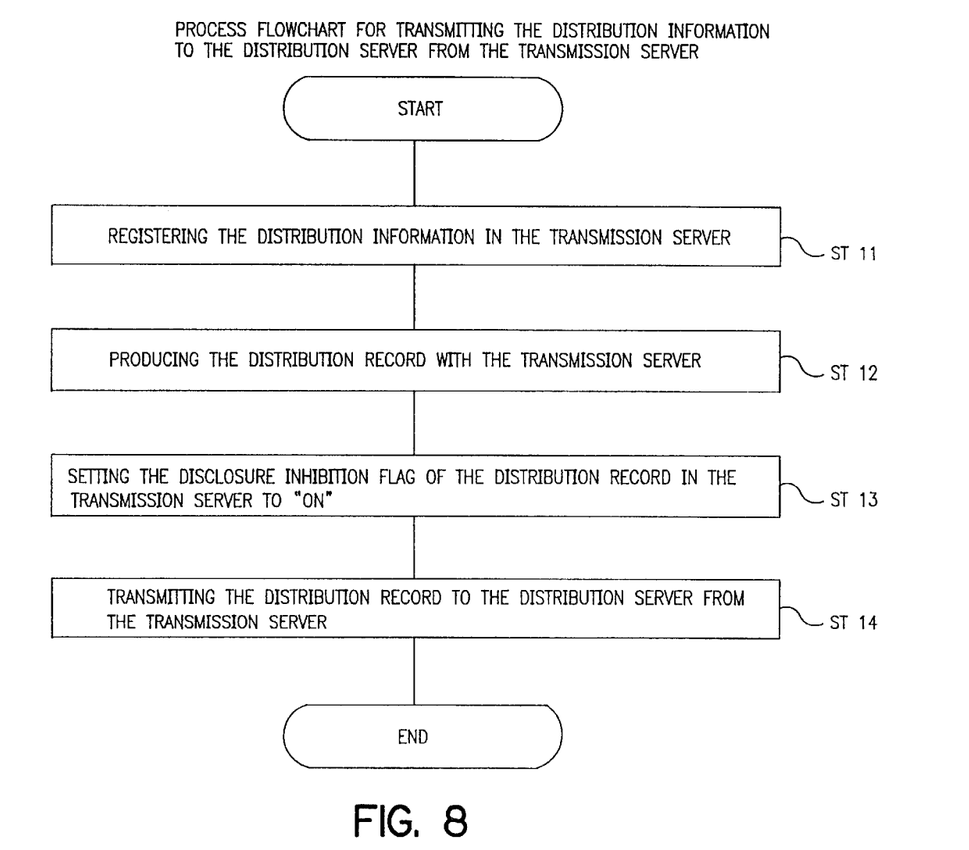
FIG. 8 is a block diagram showing a process flowchart for transmitting distribution information to a distribution server from a transmission server according to a preferred embodiment of the present invention.
Figure 9:
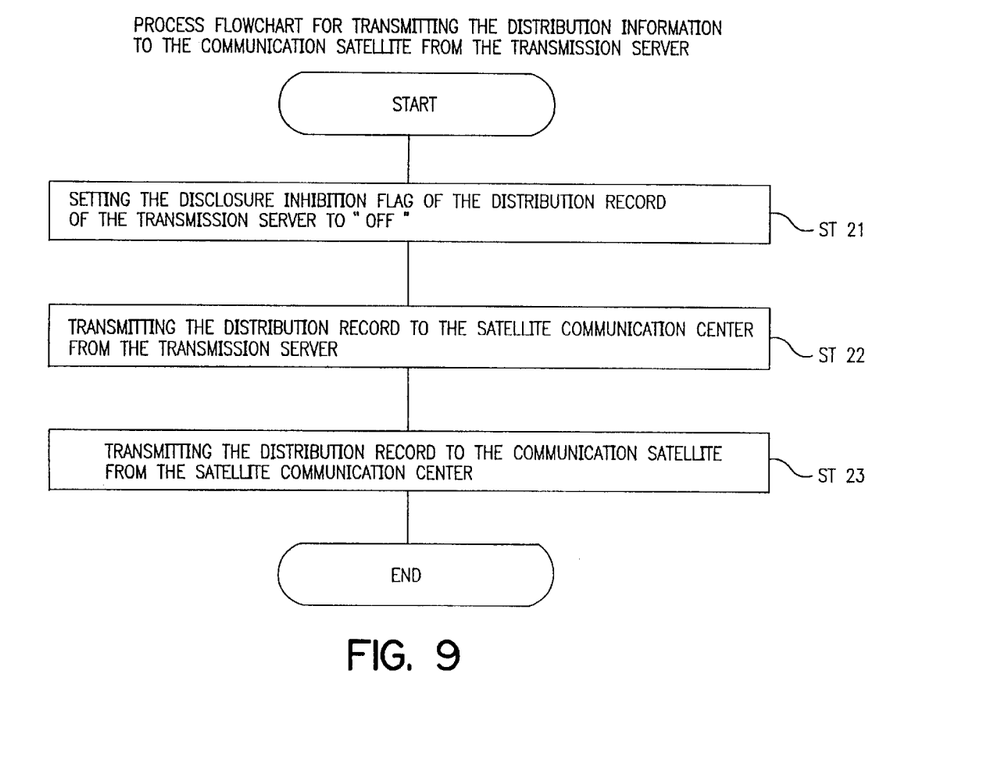
FIG. 9 is a block diagram of a process flowchart for transmitting distribution information to a communication satellite from a transmission server according to a preferred embodiment of the present invention.
Figure 10:
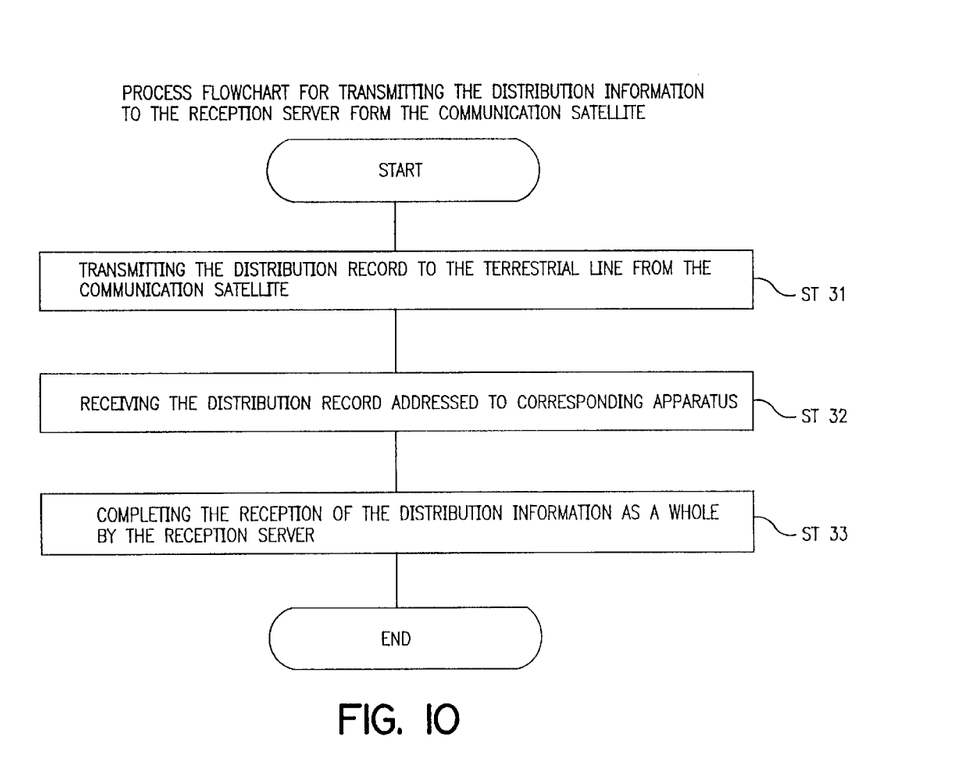
FIG. 10 is a block diagram of a process flowchart for transmitting distribution information to a reception server using satellite communication according to a preferred embodiment of the present invention.
Figure 11:
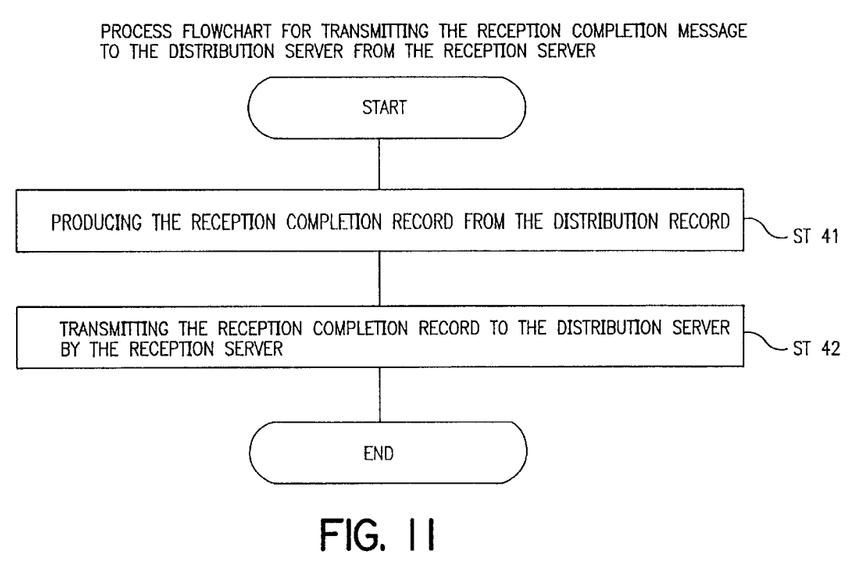
FIG. 11 is a block diagram of a process flowchart for transmitting a reception completion message to a distribution server from a reception server according to a preferred embodiment of the present invention.
Figure 12:
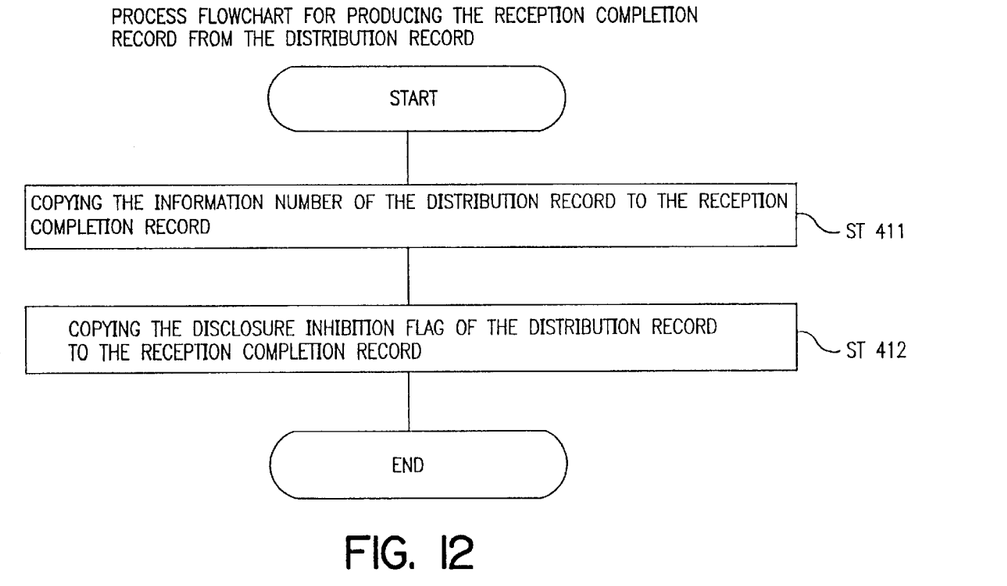
FIG. 12 is a block diagram of a process flowchart for producing a reception completion record from a distribution record according to a preferred embodiment of the present invention.
Figure 13:
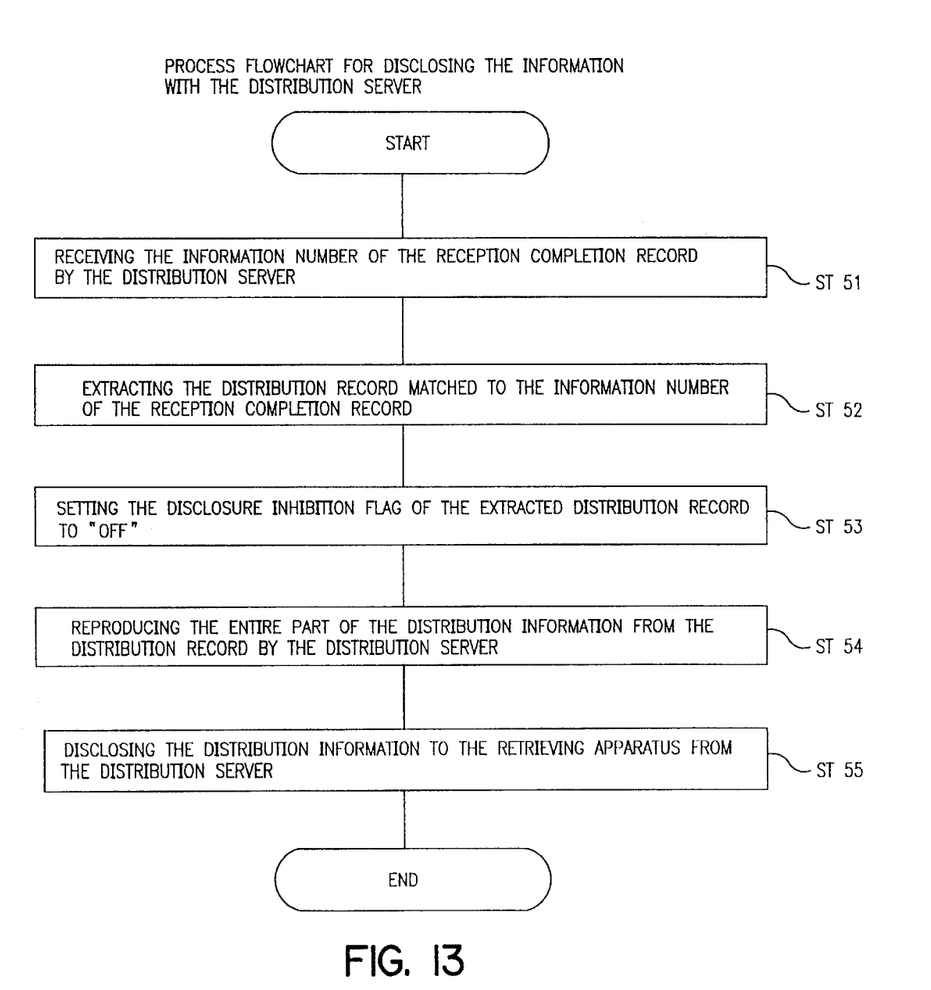
FIG. 13 is a block diagram showing a process flowchart for disclosing information with a distribution server according to a preferred embodiment of the present invention.

FIGS. 7–13 are related flowcharts which illustrate operational flow of a company information disclosure system according to a preferred embodiment of the present invention. FIG. 7 is a processing flowchart for assuring simultaneous information distribution; FIG. 8 is a processing flowchart for transmitting distribution information to a distribution server from a transmission server; FIG. 9 is a processing flowchart for transmitting distribution information to a communication satellite from a transmission server; FIG. 10 is a processing flowchart for transmitting distribution information to a reception server from a communication satellite; FIG. 11 is a processing flowchart for transmitting the reception completion message to the distribution server from the reception server; FIG. 12 is a processing flowchart for producing the reception completion record from a distribution record; and FIG. 13 is a processing flowchart for disclosing information with a distribution server.

Next, processing of the structural embodiments explained above with reference to FIGS. 1–6 will be further explained with reference to the flowcharts of FIGS. 7–13.

Disclosure information, such as a report of final account of a joint-stop company, is accepted by the securities exchange and is registered first by the securities exchange, in the step 11, as illustrated in FIG. 8. The disclosure information is accepted by the transmission server 12 provided in the securities exchange 11.

Subsequently, in the step 12, a distribution record 41 is produced by the transmission server 12 from such distribution information. At this time, the record of the disclosure time specifying table shown in FIG. 3 and FIG. 4 is produced. An operator then inputs the date of disclosure of the information registered in the registration process of step 11. However, if the disclosure date is not input, the registration processes to be conducted during trading in the securities exchange are executed with the date of that day. The registration processes conducted after completion of trading will be executed with the date of the next day. The record of the disclosure time specifying table of FIG. 3 is produced (with the destination selected to the distribution server in the securities exchange) by specifying the disclosure time to the time after 30 minutes from the trading time of the disclosure date.

Moreover, the record of the disclosure time specifying table of FIG. 4 is produced (with the destination selected to the ordinary WWW server) by specifying the disclosure time to the time after 12 hours from the disclosure time explained above.

The data of the disclosure time includes not only the time data but also the date data. The trading time of the securities exchange used for this process is registered at the time of setting the system.

Subsequently, the disclosure inhibition flag 45 of distribution record 41 is set to ON by transmission server 12 in step 13.

Thereafter, distribution record 41 is transmitted to the distribution servers provided outside of the securities exchange 10 from transmission server 12 in the step 14. As explained above, distribution information is transmitted to the distribution server from the transmission server 12 in step 1, as illustrated in FIG. 7.

Next, disclosure inhibition flag 45 of the distribution record 41 in the transmission server 12 is set to OFF in the step 21, as illustrated in the flowchart of FIG. 9. Subsequently, the distribution record 41 is transmitted to the satellite communication center 13 from transmission server 12 in step 22. Next, distribution record 41 is transmitted to communication satellite 14 from satellite communication center 13 in step 23.

As illustrated in the flowchart of FIG. 7, the distribution information is sequentially transmitted to communication satellite 14 from transmission server 12 of the step 2. At this time, an identifier of the reception server is also transmitted. The identifiers added in this case are used for reception servers 161, 162, 163. Thereafter, the distribution record 41 is transmitted to the terrestrial line from communication satellite 14 in step 31, as illustrated in the flowchart of FIG. 10.

Next, each reception server receives data addressed to its own server in the step 32. Subsequently, the reception servers 161, 162 and 163 sequentially complete reception of the distribution information as a whole in step 33. As explained above and illustrated in the flowchart of FIG. 7, the communication satellite 14 in the step 3 sequentially transmits the distribution information to the reception servers 161, 162 and 163.

Step 4 of FIG. 7 is illustrated in greater detail by FIG. 12. Subsequently, in step 411 illustrated in the flowchart of FIG. 12, the reception servers 161, 162 and 163 copy the information of the information number 46 of the distribution record 41, as illustrated in FIG. 5, to the information of the information number 54 of the reception completion record 51 illustrated in FIG. 6.

Next, in the step 412, the reception servers 161, 162 and 163 copy the value of disclosure inhibition flag 45 of distribution record 41 shown in FIG. 5 to the disclosure inhibition flag 53 of the reception completion record 51 shown in FIG. 6.

As explained above, the reception completion record 51 is produced from distribution record 41 of step 41, as illustrated in the flowchart of FIG. 11. Subsequently, reception servers 161, 162 and 163 sequentially transmit reception completion record 51 to distribution server 17 in step 42 of FIG. 11. As illustrated in the flowchart of FIG. 7, step 4 the reception servers 161, 162 and 163 respectively transmit a reception completion message to the distribution server 17.

Subsequently, as illustrated in the flowchart of FIG. 13, the distribution server 17 receives information number 54 of reception completion record 51 in the step 51. The distribution record 41 of the information number 46 is then matched with the information number 54 extracted (from the memory device of the distribution server) in step 52. Next, disclosure inhibition flag 45 of extracted distribution record 41 is set to OFF in step 53.

Distribution information as a whole is then re-produced from distribution record 41 extracted by the distribution server 17 in the step 54. Next, if the disclosure inhibition flag of the information number of the information which is requested for retrieval from the retrieving apparatus 8 is set to OFF, the distribution server 17 discloses the distribution information to the retrieving apparatus in step 55.

As set forth above, distribution server 17 of step discloses the information as illustrated in the flowchart of FIG. 7. In FIG. 7, the flow continues until disclosure by the distribution server is shown but information distribution among the processes disclosed by the ordinary WWW server is executed in the same manner as the process flowchart of FIG. 7. A message for simultaneous disclosure is issued by the transmission server 12 when the disclosure time has come to accurately assure that the WWW server 20 disclosure time occurs 12 hours after the distribution server disclosure.

In order to assure the simultaneous process of the ordinary WWW server 20 (to accurately assure the simultaneous process after 12 hours from the disclosing by the distribution server 17), the completion message to the distribution server 17 from the reception server is also transmitted to the transmission server 12 and the disclosure time of the distribution time specifying table of FIG. 4 is computed again and updated on the basis of the receiving time of such completion message. In FIG. 2, the completion message to distribution server 17 can also be received from all reception servers, however it is also possible to receive the reception completion message from only one reception server.

In the embodiment set forth above, the reception verification message is transmitted to the distribution server from the reception server in order to disperse the load of the transmission server. However, it is also possible to control the initiation of information disclosure by the distribution server from the transmission server in order to transmit the reception verification message to the transmission server from the reception server.

Thereby, distribution information such as the report of final account can be disclosed to the personal computers 182, 186 of the receiving area 192 and the personal computers 183, 187 of the receiving area 193 shown in the system of FIG. 2 at the same time as the personal computers 181, 185 in the securities exchange 10.

In addition, the content of information, such as the report of final account, is disclosed with fairness to all investors at least after about 12 hours and the stock certificate trading of the next day can be initiated in the securities exchange.

Although a few preferred embodiments of the present invention have been shown and described, it will be appreciated by those skilled in the art that changes may be made in these embodiments without departing from the principles and spirit of the invention, the scope of which is defined in the claims and their equivalents.

What is claimed is:

1. An information disclosure system, comprising:
   a first distribution unit distributing registered disclosure information received from a satellite at a first time;
   a second distribution unit distributing the registered disclosure information received from a terrestrial line at a second time different from the first time;
   a third distribution unit distributing the registered disclosure information received from a terrestrial line at a third time different from the first and second times; and
   a reception verifying unit verifying distribution of the registered disclosure information to the first distribution unit by receiving a first reception completion message from the first distributing unit and the reception verifying unit verifying distribution of the registered disclosure information to the second distribution unit by receiving a second reception completion message from the second distribution unit, wherein said reception verifying unit controls one information disclosure time of said third distribution unit to be a predetermined time after simultaneous disclosure at another information disclosure time by said first and second distribution units.

2. The information disclosure system according to claim 1, wherein said reception verifying unit includes a program running on a transmission server.

3. The information disclosure system according to claim 1, wherein the registered disclosure information is a report of final account.

4. The information disclosure system according to claim 1,
   wherein said reception verifying unit transmits a received report of final account to a plurality of processors.

5. A computer readable storage medium storing a computer program to control a computer by
   distributing by a first distribution unit registered disclosure information received from a satellite at a first time;
   distributing by a second distribution unit the registered disclosure information received from a terrestrial line at a second time;
   distributing by a third distribution unit the registered disclosure information received from a terrestrial line at a third time different from the first and second times; and
   verifying by a reception verifying unit distribution of the registered disclosure information to the first distribution unit by receiving a first communication signal from the first distributing unit and verifying distribution of the registered disclosure information to the second distribution unit by receiving a second communication signal from the second distribution unit; and
   controlling one information disclosure time of the third distribution unit to be a predetermined time after simultaneous disclosure at another information disclosure time by the first and second distribution units.

6. The storage medium according to claim 5, wherein said verifying of the distributions includes a computer program running on a transmission server.

7. The storage medium according to claim 5, wherein the registered disclosure information is a report of final account.

8. A method of information disclosure using an information disclosure system, comprising:
   distributing by a first distribution unit registered disclosure information received from a satellite at a first time;
   distributing by a second distribution unit the registered disclosure information received from a terrestrial line at a second time;
   distributing by a third distribution unit the registered disclosure information received from a terrestrial line at a third time different from the first and second times; and
   verifying by a reception verifying unit distribution of the registered disclosure information to the first distribution unit by receiving a first communication signal from the first distributing unit and verifying distribution of the registered disclosure information to the second distribution unit by receiving a second communication signal from the second distribution unit; and
   controlling one information disclosure time of the third distribution unit to be a predetermined time after simultaneous disclosure at another information disclosure time by the first and second distribution units.

* * * * *